United States Patent Office 3,404,096
Patented Oct. 1, 1968

3,404,096
PROCESS FOR IMPROVING TRIVALENT
TITANIUM CATALYSTS
Bayard T. Lamborn, Matawan, N.J., assignor to Hercules
Incorporated, a corporation of Delaware
No Drawing. Filed June 2, 1965, Ser. No. 460,846
5 Claims. (Cl. 252—429)

ABSTRACT OF THE DISCLOSURE

Titanium trichloride catalyst is improved for use in the polymerization of olefins by pretreatment in an inert diluent in the absence of an activator with an olefin having 2 to 6 carbon atoms in the amount of 0.2 to 2.0 millimoles per millimole of titanium. Use of the pretreated catalyst to polymerize olefins results in a polymer which is friable.

---

This invention relates to a process for improving trivalent titanium catalysts for use in the polymerization and copolymerization of ethylene and higher 1-olefins.

Polymers and copolymers of 1-olefin have achieved additional prominence in recent years since the discovery of the so-called transition metal catalysts, which make possible the production of such polymers having very desirable properties at relatively mild conditions of temperature and pressure. Of particular interest are the highly crystalline polymers of ethylene and propylene which have become known as high density polyethylene and stereoregular, or isotactic or stereosymmetric, polypropylene and also the highly crystalline copolymers, e.g., block copolymers, that are formed by polymerizing ethylene and propylene with each other or with a small amount of another 1-olefin.

Such polymers and copolymers, as normally made by the use of a transition metal catalyst, are recovered in the form of small particles ranging in size from about 75 to 800 microns in their largest dimension. More recently, the art has found a need for polymers of smaller particle size for use as flatting agents in paints, or for use in organosol coating, electrostatic spraying, and related applications. These smaller sized particles are commonly obtained by grinding the larger particles obtained from the polymerization. Grinding of the polymers is, however, a very difficult and expensive procedure as the polymers are not easily friable, and the reproducibility of grinding is very poor.

The generic term "transition metal catalysts" is used in the polyolefin art to refer to a class of catalyst compositions comprising transition metal compounds in a reduced valence state in combination with an activator which is usually an alkylaluminum compound. The transition metal compounds most widely used are compounds of trivalent titanium. The preferred trivalent titanium compound is "titanium trichloride," a term which is used generically in the art as it is applied not only to pure titanium trichloride but also to compositions in which titanium trichloride is co-crystallized with an aluminum compound such as aluminum trichloride. For example, a material sold commercially and referred to as titanium trichloride and made by reduction of $TiCl_4$ with metallic aluminum is actually co-crystallized $3TiCl_3 \cdot AlCl_3$ having the empirical formula $AlTi_3Cl_{12}$. Other compounds referred to as titanium trichloride can be prepared by reducing $TiCl_4$ with hydrogen, metallic titanium, or titanium monoxide. Another method of making titanium trichloride comprises reducing $TiCl_4$ with an organoaluminum compound such as a trialkylaluminum or an alkylaluminum halide. Here again, the product of such reduction is not pure $TiCl_3$, but titanium trichloride co-crystallized with other materials such as with $AlCl_3$ or with $AlCl_3$ and an organoaluminum halide. See, for instance, U.S. Patents 3,058,963 and 3,108,973 to E. J. Vandenberg and U.S. Patent 3,128,252 to Tornqvist et al.

It is an object of the present invention to provide a process for conditioning a titanium trichloride catalyst so that when the catalyst is used in known manner to produce highly crystalline polymers, including copolymers, of ethylene or propylene, polymer particles are produced that are friable and easily ground. In accordance with the invention it has been discovered that if a titanium trichloride catalyst is pretreated under certain conditions with a 1-olefin having from 2 to 6 carbon atoms in the substantial absence of an activator for the catalyst, the physical form of the catalyst is so changed that its use as a polymerization catalyst leads to crystalline polyolefins that are so friable as to be easily ground into small size particles.

More specifically, the process of the invention comprises contacting a titanium trichloride catalyst in an inert liquid organic diluent in which the catalyst is insoluble at a concentration ranging from about 0.1 to 1.0 millimole titanium per milliliter of diluent, with a 1-olefin having from 2 to 6 carbon atoms in the amount of about 0.2 to 2.0 millimoles per millimole of titanium at a temperature of about 0 to 50° C. in the substantial absence of an activator for the catalyst; and for a time sufficient for the olefin to penetrate and alter the crystal structure of the catalyst, usually a minimum of about 10 minutes. As a result of the process, the catalyst undergoes a physical change whereby it agglomerates into curds and appears to swell. However, it is easily broken into small pieces by slight pressure or modest agitation.

When the titanium trichloride catalyst processed according to the invention is used to polymerize ethylene or propylene or to copolymerize such monomers with minor amounts of another 1-olefin by a slurry process, a crystalline polymer is formed which in appearance resembles the polymers which are obtained by using the same catalyst but not treated according to the invention. The polymer, however, is much more readily friable than the polymer obtained by use of the untreated catalyst and is very easily ground by conventional grinding equipment. On the other hand, polymer prepared with the untreated catalyst is very resistant to grinding.

The process of the invention is carried out simply by adding a 1-olefin and a titanium trichloride catalyst to an inert liquid organic diluent in the amounts specified above while maintaining the temperature within the above-stated range of 0 to 50° C., preferably 25 to 35° C., for a period of at least about 10 minutes. The most convenient procedure is to add the catalyst to the diluent, thereby forming a dispersion, and then to bubble in the olefin at a rate at which substantially all of the olefin dissolves in the diluent. The end point of the process is easily observed and is characterized by a swelling and agglomeration of the catalyst into curds. The extent to which the catalyst is swollen is governed by the quantity of 1-olefin added. At about the 0.2 millimole level only a slight change in the structure is effected; while at the 1.5 millimole level a much greater change occurs, and the polymerization product made therewith is much more fragile.

The process is, as previously specified, carried out in the absence of an activator for the catalyst. This is not meant to preclude, however, small amounts of an activator which might be contained in the catalyst as a result of its method of preparation. For example, when the catalyst is prepared by reducing $TiCl_4$ with an organoaluminum compound, some small amount of organoaluminum compound may be contained in the catalyst.

The diluent employed for treating the catalyst can be any of those diluents that are well known in the art as suitable for the polymerization of ethylene and propylene. These include, by way of example, saturated liquid aliphatic hydrocarbons such as hexane, heptane, decane, and the like; cycloaliphatic hydrocarbons such as cyclohexane; halogenated hydrocarbons such as chlorobenzene; and mixtures of any such diluents. The 1-olefin that is used for treating the catalyst may be any of those containing from 2 to 6 carbon atoms, including ethylene, propylene, butene-1, isobutylene, and 4-methylpentene-1.

The catalyst treated according to the invention is useful for the polymerization of ethylene and propylene and for copolymerization, including block copolymerization, of such monomers by any of the procedures well known in the art but is particularly advantageous for use in slurry polymerization, i.e., polymerization which is conducted in a diluent and at a temperature such that the polymer that is formed is insoluble and thereby forms a slurry in the diluent. Suitable diluents are those listed above for use in pretreatment of the catalyst. The selection of temperature and pressure used for the polymerization process is quite variable and can be any temperature below the solution point of the polymer that is being formed. An organoaluminum compound is used as an activator, preferably an alkylaluminum compound such as triethylaluminum or diethylaluminum chloride. Monoalkylaluminum compounds such as ethylaluminum dichloride can also be used in combination with a third component such as diethyl ether or other compounds, numerous examples of which are given in the prior art.

The following examples illustrate the process of the invention. Parts and percentages, unless otherwise specified, are by weight.

Example 1

Titanium trichloride catalyst was prepared by adding 3.1 parts of a 1.2 molar solution of ethylaluminum sesquichloride (47% diethylaluminum chloride and 53% ethylaluminum dichloride) in a liquid paraffinic hydrocarbon boiling in the range of about 180–200° C. to a 3.6 molar solution of $TiCl_4$ in the same diluent. The addition was made slowly over a period of 4 hours while maintaining the reaction mixture at 0° C. The temperature was then raised to 95° C. and held at this temperature for about 4 hours. The titanium chloride catalyst precipitated from the mixture was separated by filtration and washed with additional diluent.

The catalyst was redispersed in the diluent to form a dispersion containing 0.98 millimole of titanium per cc. To 750 cc. of this dispersion 39 grams of butene-1 were added at room temperature over a period of 6 hours while stirring. The catalyst during this period swelled and agglomerated into curds.

The catalyst which had been treated with butene-1 as above was used in the polymerization of propylene using diethylaluminum chloride as activator. The polymerization was carried out by preparing a dispersion of catalyst in the diluent at a concentration of 10 millimoles titanium per liter together with 20 millimoles diethylaluminum chloride per liter. To this dispersion propylene in gaseous form was added at the rate of 28 grams per liter per hour over a period of 5 hours while maintaining the temperature of 50° C. The same polymerization procedure was repeated but using a catalyst which had not been pretreated with butene-1 in accordance with the invention. In each case, polypropylene having a particle size from about 150 to 200 microns was produced as a precipitate.

Polypropylene from both runs was ground in an Alpine mill and then subjected to a screening analysis. The results of the screening analysis of the polymers made from treated and untreated catalysts are as follows:

| | Treated catalyst, percent | Untreated catalyst, percent |
|---|---|---|
| On 100 mesh (149μ) | 1 | 4 |
| On 140 mesh (105μ) | 9 | 36 |
| On 200 mesh (74μ) | 13 | 47 |
| On 230 mesh (62μ) | 1 | 2 |
| Pan | 76 | 11 |

From the foregoing data it is obvious that the polymer made using the catalyst of the invention was ground to much smaller particles than the control polymer.

Example 2

The same procedure was repeated using as the starting catalyst a commercial titanium trichloride catalyst identified as Stauffer AA $TiCl_3$ (co-crystallized $TiCl_3 \cdot AlCl_3$). The results of the screening analysis of the polypropylene made with the treated catalyst and the untreated catalyst are as follows:

| Screen size | Untreated catalyst, percent | Treated catalyst, percent |
|---|---|---|
| 60 | 64.4 | 35.2 |
| 100 | 13.1 | 4.7 |
| 140 | 6.0 | 9.1 |
| 200 | 4.2 | 9.6 |
| 230 | 1.3 | Nil |
| Pan | 11.0 | 31.5 |

Again the improvement noted due to the use of the catalyst treated according to the invention was evident.

Example 3

Results similar to those obtained in Example 1 were obtained upon repetition of the general procedure of that example but substituting 4-methylpentene-1 and ethylene for the butene-1 used for pretreatment. The amount of 4-methyl-pentene-1 was 0.5 millimole per millimole of titanium trichloride, and the amount of ethylene used was 1 millimole per millimole of titanium trichloride.

What I claim and desire to protect by Letters Patent is:

1. A process for improving a titanium trichloride catalyst for use in the polymerization of olefins which comprises contacting said catalyst in an inert liquid organic diluent in which the catalyst is insoluble at a concentration ranging from about 0.1 to 1.0 millimole of titanium per milliliter of diluent with a 1-olefin having from 2 to 6 carbon atoms in the amount of about 0.2 to 2.0 millimoles per millimole of titanium at a temperature of about 0 to 50° C. in the substantial absence of an activator for the catalyst.

2. The process of claim 1 wherein the 1-olefin is ethylene.

3. The process of claim 1 wherein the 1-olefin is 4-methylpentene-1.

4. The process of claim 1 wherein the 1-olefin is butene-1.

5. The process for improving a titanium catalyst for use in the polymerization of olefins which comprises suspending said catalyst in an inert liquid organic diluent in which the catalyst is insoluble in the amount of from about 0.1 to 1.0 millimole of titanium per milliliter of diluent at a temperature of about 0 to 50° C., and introducing a gaseous 1-olefin having from 2 to 6 carbon atoms into the catalyst suspension until an amount of 1-olefin equal to from about 0.2 to 2.0 millimoles per millimole of titanium is dissolved in the diluent, said process being conducted in the substantial absence of an activator for the catalyst.

References Cited

UNITED STATES PATENTS

| 2,930,807 | 3/1960 | Case | 252—429 |
| 2,936,302 | 5/1960 | Jones et al. | 252—429 |
| 3,062,801 | 11/1962 | Hoeg et al. | 252—429 |

PATRICK P. GARVIN, *Primary Examiner.*